United States Patent Office 3,158,581
Patented Nov. 24, 1964

3,158,581
POLYMERIC EPOXIDES
Edwin J. Vandenberg, Wilmington, Del., assignor to Hercules Powder Company, Wilmington, Del., a corporation of Delaware
No Drawing. Filed July 27, 1960, Ser. No. 45,530
8 Claims. (Cl. 260—2)

This invention relates to new high molecular weight amorphous copolymers of expoxides and, more particularly, to copolymers of a halogen-containing epoxide and at least one other epoxide.

It is well known that halogen-containing epoxides, such as epichlorohydrin, can be polymerized to low molecular weight homopolymers that are useful as plasticizers, etc. Such polymers have, however, been limited in their usefulness. It is also known that epichlorohydrin can be polymerized to high molecular weight crystalline homopolymers.

It has now been discovered that epoxides containing at least one aliphatic halogen group can be copolymerized with at least one alkylene oxide, phenyl alkylene oxide or saturated glycidyl ether to produce new and useful high molecular weight amorphous copolymers that, unlike the prior art liquid or crystalline homopolymers, are usually elastomeric and are capable of being vulcanized to products possessing a variety of uses.

Accordingly, the present invention relates to a solid amorphous copolymer of an epoxide containing at least one aliphatic halogen group and at least one other epoxide having the formula

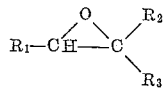

where $R_1$, $R_2$ and $R_3$ are radicals selected from the group consisting of hydrogen, alkyl, alkoxyalkyl and phenyl radicals, but at least one of said R radicals being hydrogen, said copolymer having a Reduced Specific Viscosity (RSV) of at least about 0.5, and more preferably at least about 1.0, as measured on a 0.1% solution of the copolymer in α-chloronaphthalene at 100° C.

The term "Reduced Specific Viscosity," which is a function of molecular weight, is used herein to designate the $\eta sp/c$ determined on a 0.1% solution of the copolymer in a given diluent and at a given temperature.

The new copolymers of this invention are those produced by the copolymerization of an epoxide containing at least one aliphatic halogen group with at least one alkylene oxide, phenyl alkylene oxide or saturated glycidyl ether, which copolymers contain from about 1% to about 95%, and preferably from about 5% to about 90%, by weight of said halogen-containing epoxide. The halogen-containing epoxides which can be used in the preparation of these copolymers have the formula

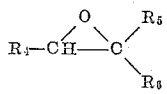

where $R_4$ and $R_5$ are radicals selected from the group consisting of hydrogen, alkyl and haloalkyl radicals, but at least one of said $R_4$ and $R_5$ radicals being hydrogen; $R_6$ is a radical selected from the group consisting of haloalkyl and haloalkoxyalkyl radicals; preferably both $R_4$ and $R_5$ being hydrogen when $R_6$ is haloalkoxyalkyl. Those halogen-containing expoxides having the formula

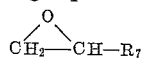

where $R_7$ is ether haloalkyl or haloalkoxyalkyl are most preferred. Exemplary of the halogen-containing epoxides are the epihalohydrins, such as epichlorohydrin, epibromohydrin, epifluorohydrin or epiiodohydrin; haloalkyl glycidyl ethers such as 2,2-bis(chloromethyl)ethyl glycidyl ether, 2-chloroethyl glycidyl ether, 2-bromoethyl glycidyl ether, 2-chloro-1-methylethyl glycidyl ether, 2,2,2-tris(chloromethyl) ethyl glycidyl ether, etc.; and haloalkylene oxides such as 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane, 1,1,1-trichloro-3,4 - expoxybutane, 1,1,1-trifluoro-2,3-epoxypropane, 1,1' - bis(chloromethyl)ethylene oxide, 3-chloro-2-methyl-1,2-epoxypropane, cis- and trans-1,4-dichloro-2,3-epoxybutane, etc. Any one of the above-defined halogen-containing epoxides or mixtures thereof can be copolymerized with another epoxide monomer or mixture of monomers having the formula

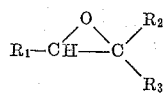

where $R_1$, $R_2$ and $R_3$ are hydrogen, alkyl, alkoxyalkyl or phenyl radicals, but at least one is hydrogen. Exemplary of such monomers are the alkylene oxides such as ethylene oxide, propylene oxide, cis- and trans- but preferably cis-butene-2 oxide, butene-1 epoxide, cis- and trans-pentene-2 oxide, cis- and trans-hexene-2 oxide, cis- and trans-hexene-3 oxide, cyclohexene oxide, etc.; phenyl alkylene oxides such as styrene oxide, etc.; and saturated glycidyl ethers such as methyl glycidyl ether, ethyl glycidyl ether, methylethyl glycidyl ether, butyl glycidyl ether, phenyl glycidyl ether, etc.

The preparation of these new copolymers is readily carried out by contacting a mixture of the monomers with an organoaluminum compound or complex. Any organoaluminum compound reacted with water can be used as the catalyst in the preparation of these copolymers. Exemplary of the organoaluminum compounds that can be used are trialkylaluminum compounds, dialkylaluminum halides, monoalkylaluminum dihalides, dialkylaluminum hydrides, dialkylaluminum monoalkoxides, the corresponding cycloalkyl and aryl compounds and complexes of these compounds. These organoaluminum compounds can be reacted with from about 0.01 to about 1.5 moles of chelating agent per mole of aluminum before being reacted with water, if desired. Exemplary of the chelating agents that can be reacted with a trialkylaluminum or dialkylaluminum hydride and the chelate then reacted with water are diketones, ketoacids, ketoesters, ketoaldehydes, hydroxyaldehydes, dicarboxylic acids and their esters, dialdehydes, ketoximes, dialdehyde monooximes, dioximes, nitro compounds, nitroso compounds, etc. Regardless of the organoaluminum compound that is used, it should be reacted with from about 0.1 to about 1.5 moles of water and preferably from about 0.5 to about 1 mole of water per mole of the organoaluminum compound.

The polymerization reaction is generally carried out in the presence of an inert liquid organic diluent but can be carried out in an essentially bulk polymerization process. Suitable diluents that can be used for the polymerization are the ethers, such as diethyl ether, dipropyl ether, dibutyl ether, etc.; halogenated hydrocarbons such as chlorobenzene, methylene chloride, etc.; a hydrocarbon diluent such as propane, butanes, pentanes, n-heptane, cyclohexane, benzene, toluene, etc., or a mixture of such diluents. The temperature of the polymerization process can be varied over a wide range generally from about −80° C. to about 250° C., and preferably from about −30° C. to about 100° C., and while atmospheric or autogenous pressure is usually used, the pressure can be varied from subatmospheric up to several atmospheres, if desired.

The following examples illustrate the preparation of the new copolymers in accordance with this invention.

EXAMPLE 1

To a polymerization vessel with a nitrogen atmosphere was added 37.6 parts of diethyl ether, 15.3 parts of epichlorohydrin and 4.8 parts of propylene oxide. After equilibrating at 30° C., a catalyst solution was added in 4 equal portions at 30-minute intervals. Said catalyst solution consisted of 1.58 parts of triisobutylaluminum complexed with 0.5 mole of water per mole of aluminum in a 50:50 mixture of n-heptane and diethyl ether. After 20 hours at 30° C., the copolymerization was stopped by adding 4 parts of anhydrous ethanol, after which 35 parts of diethyl ether were added to the reaction mixture. It was then washed twice with a 3% aqueous solution of hydrogen chloride, then with water until neutral and then with a 2% aqueous solution of sodium bicarbonate. After again washing with water, the ether-insoluble copolymer was separated by centrifugation. This ether-insoluble polymer was washed with ether and then with ether containing 0.2% of the antioxidant 4,4'-thio-bis(6-tert-butyl-m-cresol), after which is was dried for 16 hours under vacuum. It was a white powder and shown to be crystalline by X-ray.

An ether-soluble polymer was recoverd by combining the ether filtrate and washes, removing the ether until a viscous solution was obtained and then precipitating the polymer by adding about 10 volumes of methanol containing 0.2% 4,4'-thio-bis(6-tert-butyl-m-cresol). The methanol-insoluble polymer was then washed twice with the methanol antioxidant solution and dried. This methanol-insoluble copolymer had an RSV of 1.0 (as determined in α-chloronaphthalene at a temperature of 100° C.) and was a tacky rubber which was shown to be amorphous by X-ray. A chlorine analysis showed that it contained 56% of the epichlorohydrin monomer.

EXAMPLE 2

To a polymerization vessel with a nitrogen atmosphere was charged 24.1 parts of n-heptane, 6.2 parts of ethylene oxide and 3.8 parts of epichlorohydrin. After equilibrating at 30° C., a catalyst solution was added in 2 equal portions 30 minutes apart. The catalyst solution consisted of 0.18 part of triethylaluminum reacted with an equimolar amount of acetylacetone and 0.5 mole of water per mole of aluminum at 0.5 M concentration in a 70:30 mixture of n-heptane and diethyl ether. After 6 hours at 30° C., the copolymerization was stopped by adding 4 parts of anhydrous ethanol. The ether-insoluble copolymer was isolated by adding excess ether to the reaction mixture, filtering, washing with ether, then with 0.5% hydrogen chloride in a 80:20 mixture of ether to methanol, with 80:20 ether to methanol mixture alone and then with ether containing 0.4% 4,4'-thio-bis(6-tert-butyl-m-cresol). The ethylene oxide–epichlorohydrin copolymer so obtained had an RSV of 22.5 (as determined in chloroform at a temperature of 25° C.) and was a tough, largely water-soluble, snappy rubber which was shown to be essentially amorphous by X-ray. A chlorine analysis showed that it contained 13% of the epichlorohydrin monomer.

EXAMPLE 3

To a polymerization vessel with a nitrogen atmosphere was charged 28.6 parts of n-heptane, 8.0 parts of ethylene oxide and 2.0 parts of 2-chloroethyl glycidyl ether. After equilibrating at 30° C., a catalyst solution prepared with 0.46 part triethylaluminum was added in 2 equal portions 30 minutes part. The catalyst solution was the same as the solution described in Example 2. After 5 hours at 30° C., the polymerization was stopped by adding 4 parts of anhydrous ethanol. The copolymer was isolated by adding an excess of n-heptane to precipitate the polymer, filtering, and then washing with n-heptane and a 0.2% solution of 4,4'-thio-bis(6-tert-butyl-m-cresol) in n-heptane and finally drying for 16 hours at 80° C. in vacuo. The ethylene oxide–2-chloroethyl glycidyl ether copolymer was obtained in 18% conversion and had an RSV of 14.6 (as determined in chloroform at a temperature of 25° C.). It was a somewhat hard, tough rubber which was shown to be largely amorphous by X-ray and found to be largely soluble in water. A chlorine analysis of this copolymer showed that it contained 7% of the 2-chloroethyl glycidyl ether monomer.

A sample of the ethylene oxide–2-chloroethyl glycidyl ether copolymer was reacted with a tertiary amine to form a quaternary ammonium salt as follows: One part of the copolymer and 20 parts of a 20% aqueous trimethylamine solution were reacted in a closed vessel at 80° C. overnight. A clear viscous cationic solution suitable for use as a retention aid in the sizing of paper resulted. An analysis of the quaternized derivative showed that it contained 0.9% nitrogen.

EXAMPLE 4

To a polymerization vessel with a nitrogen atmosphere was charged 39.8 parts of toluene, 1.0 part of propylene oxide and 9.0 parts of epichlorohydrin. After equilibrating at 30° C., a 0.5 M catalyst solution consisting of 0.23 part triethylaluminum reacted with 0.5 mole each of acetylacetone and water per mole of aluminum in a 70:30 mixture of n-heptane to diethyl ether was added. After 30 hours at 30° C., the copolymerization was stopped by adding 4 parts of anhydrous ethanol. A copolymer fraction was precipitated by adding an excess of n-heptane to precipitate the polymer, filtering, and then washing with n-heptane and a 0.2% solution of 4,4'-thio-bis(6-tert-butyl-m-cresol) in n-heptane and finally drying for 16 hours at 80° C. in vacuo. The n-heptane-insoluble propylene oxide–epichlorohyrin copolymer obtained in 21% conversion had an RSV of 9.6 (as determined in α-chloronaphthalene at a temperature of 100° C.) and was a tough rubber, the major portion of which was shown to be amorphous by X-ray. A chlorine analysis showed that it contained 77% epichlorohydrin.

The copolymer obtained above was 85% soluble in acetone at room temperature. The acetone-soluble fraction had an RSV of 7.6 (as determined in α-chloronaphthalene at a temperature of 100° C.). It was a tough rubber which was shown to be almost completely amorphous by X-ray. A chlorine analysis showed that it contained 76% epichlorohydrin.

EXAMPLES 5–10

In these examples various epoxides were copolymerized in 40 parts of toluene using 10 parts total monomer at a temperature of 30° C. using the general procedure described in Example 4. The catalyst described in Example 4 (prepared from 0.23 part triethylaluminum) was used in each case. The copolymers were isolated by precipitating with 1–5 volumes of n-heptane, filtering, washing with n-heptane, washing with a 0.2% solution of 4,4'-thio-bis(6-tert-butyl-m-cresol) in n-heptane and finally drying for 16 hours at 80° C. under vacuum.

In Table I are set forth the monomers copolymerized and the amount of each, the reaction time, the percent conversion to isolated copolymer and the RSV of each copolymer determined on a 0.1% solution in (1) chloroform at 25° C., (2) α-chloronaphthalene at 100° C., and (3) α-chloronaphthalene at 135° C. The monomers copolymerized are indicated by the following abbreviations:

SO=styrene oxide
PO=propylene oxide
EO=ethylene oxide
BO=butene-1 oxide
DO=dodecene-1 oxide
ECH=epichlorohydrin The copolymers produced in these examples were largely amorphous, the copolymer of Example 7 being completely amorphous as shown by X-ray.

room temperature over a 72-hour period to constant weight. The weights of initial and final samples are corrected for nonpolymer content based on knowledge of Table I

| Example No. | 5 | | 6 | | 7 | | 8 | | 9 | | 10 | |
|---|---|---|---|---|---|---|---|---|---|---|---|---|
| Monomer | EO | ECH | BO | ECH | EO | ECH | DO | ECH | PO | ECH | SO | ECH |
| Parts of Monomer, Wt. percent | 49 | 51 | 10 | 90 | 10 | 90 | 10 | 90 | 20 | 80 | 10 | 90 |
| Reaction Time, Hrs | 6 | | 20 | | 27 | | 20 | | 30 | | 30 | |
| Isolated Copolymer: | | | | | | | | | | | | |
| Percent Conversion | 22 | | 31 | | 19 | | 19 | | 18 | | | |
| RSV | 11.4 (1) | | 12.9 (3) | | 9.2 (2) | | 8.0 (3) | | 11.9 (2) | | >4 (3) | |
| Monomer Composition, Wt. percent | 86 | 14 | 16 | 84 | 40 | 60 | 10 | 90 | 36 | 64 | 40 | 60 |
| Solubility in Acetone (percent) | 100 | | 66 1 | | 83 | | 56 | | 99.5 | | >70 | |
| Solubility in Water (percent) | 74 | | Insoluble | | Insoluble | | Insoluble | | Insoluble | | Insoluble | |
| Appearance | Hard, tough rubber. | | Tough rubber. | | Snappy rubber. | | Tough rubber. | | Tough rubber. | | Somewhat hard, tough rubber. | |

[1] The acetone-soluble copolymer contained 82% ECH and had an RSV of >7 (3).

Copolymers from Examples 5, 7 and 9 were cross-linked, i.e. vulcanized, by compounding on a two-roll mill for 5-7 minutes, 100 parts of the copolymer with one of the specific cross-linking formulations given below and then press curing at 155° C. for 40 minutes.

| Formula No. | I | II |
|---|---|---|
| Fast extruding furnace black | 30 | 30 |
| Tri-n-butylamine | 10 | |
| Triethylenediamine | | 4 |
| Sulfur | 2 | |
| Zinc oxide | 3 | |
| Stearic oxide | 2 | |
| Mercaptobenzothiazole | 1.5 | |

The physical data and the cross-linked copolymers are given in Table II.

Table II

| Example No. | 5 | 7 | 9 |
|---|---|---|---|
| Cross-linking formula | I | II | I |
| Tensile Strength, p.s.i. | 4,000 | 1,325 | 975 |
| Modulus 300%, p.s.i. | 727 | 1,140 | 555 |
| Ultimate Elongation, percent | 1,040 | 330 | 500 |
| Break Set, percent | 45 | 5 | 20 |
| Shore Hardness A-2 | 86 | 50 | 50 |
| Percent Gel Formation | 100 | 100 | 91 |
| Percent Swell | 185 | 180 | 400 |

The percent gel formation is indicative of the percentage of copolymer that is cross-linked, and the percent swell is inversely proportional to the tightness of cross-linking. The percent gel and percent swell are determined as follows: A weighted cylindrical sample of copolymer weighing about 100 milligrams is soaked in an excess of toluene (30 cc.) in a closed container for 4 hours at 80° C. After cooling to room temperature, the sample is removed, blotted on filter paper without squeezing, so as to remove toluene on the surface, and weighed at once. The swollen sample is then dried in a current of air at room temperature over a 72-hour period to constant weight. The weights of initial and final samples are corrected for nonpolymer content based on knowledge of components. From these figures $$\text{Percent gel} = \frac{\text{Corrected dry weight}}{\text{Corrected initial weight}} \times 100$$

Similarly, percent swell is calculated by the formula:

$$\text{Percent swell} = \frac{\text{Corrected swollen weight} - \text{corrected dry weight}}{\text{Corrected dry weight}} \times 100$$

EXAMPLES 11–14

In these examples various epoxides were copolymerized (using 10 parts total monomer) at a temperature of 30° C. using the general procedure described in Example 4 except that the initial diluent was 31 parts of n-heptane. The catalyst described in Example 4 was used in each case. The copolymer of Example 11 was isolated by precipitating with an excess of n-heptane, filtering, washing with n-heptane, washing with a 0.2% solution of 4,4'-thio-bis(6-tert-butyl-m-cresol) in n-heptane and finally drying for 16 hours at 80° C. under vacuum.

The copolymers of Examples 12–14 were isolated by adding sufficient ether to make the solution of low viscosity for ease in handling, then washing the reaction mixture twice with a 3% aqueous solution of hydrogen chloride (one hour stirring for each wash), then with water until neutral. After adding 4,4'-thio-bis(6-tert-butyl-m-cresol) equal to 0.5% based on the copolymer, the ether was evaporated and the copolymer was dried.

In Table III are set forth the monomers copolymerized and the amount of each, the amount of triethylaluminum complexed with acetylacetone and water, the reaction time, the percent conversion to isolated copolymer and the RSV of each copolymer determined on a 0.1% solution in (1) α-chloronaphthalene at 100° C. and (2) benzene at 25° C. The monomers copolymerized are indicated by the following abbreviations:

PO=propylene oxide
ECH=epichlorohydrin
CEGE=2-chloroethyl glycidyl ether

The copolymers produced in these examples were all tough rubbers and completely amorphous as shown by X-ray.

Table III

| Example No. | Monomer | Parts of Monomer, Wt. Percent | Parts of triethyl-aluminum | Reaction Time, Hrs. | Percent Conversion | RSV | Monomer Composition, Wt. Percent | Solubility in acetone, Percent |
|---|---|---|---|---|---|---|---|---|
| 11 | PO | 40 | 0.23 | 46 | 22 | 10(1) | 48 | 100 |
| | ECH | 60 | | | | | 52 | |
| 12 | PO | 60 | 0.23 | 6 | 25 | 8.7(2) | 70 | |
| | ECH | 40 | | | | | 30 | |
| 13 | PO | 80 | 0.23 | 19 | 28 | 14.5(2) | 84 | |
| | ECH | 20 | | | | | 16 | |
| 14 | PO | 80 | 1 0.46 | 7.5 | 41 | 9.2(2) | 78 | |
| | CEGE | 20 | | | | | 22 | |

[1] Added in two equal portions 1 hour apart.

Each of the copolymers was cross-linked by compounding with Formula II as described in Examples 5-10 and press curing at 155° C. for 40 minutes. The physical data on the cross-linked copolymers are given in Table IV.

*Table IV*

| Example No | 11 | 12 | 13 | 14 |
|---|---|---|---|---|
| Tensil Strength, p.s.i | 815 | 585 | 310 | 1130 |
| Modulus 300%, p.s.i | | 435 | 160 | 1080 |
| Ultimate Elongation, percent | 210 | 450 | 650 | 310 |
| Break Set, Percent | 10 | 20 | 70 | 10 |
| Shore Hardness A-2 | 56 | 45 | 37 | 56 |
| Percent Gel Formation | 96 | 92 | | 94 |
| Percent Swell | 280 | 430 | | 295 |

EXAMPLE 15

Propylene oxide (5 parts) and 3-chloro-2-methyl-1,2-epoxypropane (5 parts) were copolymerized in 40 parts of dry toluene at a temperature of 30° C. using the general procedure described in Example 4. The catalyst consisted of 0.45 part of triethylaluminum reacted at 0.5 M concentration with 0.5 mole each of acetylacetone and water per mole of aluminum in a 70:30 mixture of n-heptane to diethyl ether. The catalyst was added in two equal portions one hour apart. After 6 hours the reaction was stopped by adding 2 parts of ethanol. The copolymer was isolated by adding sufficient ether to make the solution of low viscosity for ease in handling, then washing the reaction mixture twice with a 3% aqueous solution of hydrogen chloride (1 hour stirring for each wash) and then with water until neutral. After adding 4,4'-thio-bis(6-tert-butyl-m-cresol) equal to 0.5% based on the polymer, the ether was evaporated and the polymer was dried for 16 hours at a temperature of 80° C. in vacuo. The rubbery propylene oxide–3-chloro-2-methyl-1,2-epoxypropane copolymer obtained had an RSV of 12.7 (as determined in benzene at a temperature of 25° C.) and was shown to be largely amorphous by X-ray. A chlorine analysis of this copolymer showed that it contained 1.1% of the 3-chloro-2-methyl-1,2-epoxypropane monomer.

EXAMPLE 16

Propylene oxide (8.0 parts) and 1,1-bis(chloromethyl) ethylene oxide (2.0 parts) were copolymerized in 28.7 parts n-heptane at a temperature of 30° C. using the procedure described in Example 15. The amount and composition of catalyst was the same as recited in Example 15. After 5 hours the copolymer was isolated by the same procedure as described in Example 15. The propylene oxide–1,1-bis(chloromethyl)ethylene oxide obtained had an RSV of 6.7 (as determined in benzene at a temperature of 25° C.) and was a snappy rubber. A chlorine analysis showed that it contained about 0.7% of the 1,1-bis(chloromethyl)ethylene oxide monomer.

A portion of the copolymer was cross-linked, i.e., vulcanized, by compounding on a two-roll mill for 5–7 minutes 100 parts of the copolymer with 30 parts fast extruding furnace black and 4 parts triethylenediamine and then press curing at 155° C. for 40 minutes. The vulcanizate had 86% gel and 1060% swell.

EXAMPLES 17 AND 18

In these examples ethylene oxide, propylene oxide and epichlorohydrin were terpolymerized in 80 parts of toluene using approximately 20 parts total monomer at a temperature of 30° C. using the general procedure described in Example 4. The catalyst consisted of 0.45 part of triethylaluminum reacted at 0.5 M concentration with 0.5 mole each of acetylacetone and water per mole of aluminum in a 70:30 mixture of n-heptane to diethyl ether. The terpolymer products were isolated by the same procedure as described in Example 4.

In Table V are set forth the monomers terpolymerized and the amount of each, the reaction time, their percent conversion to isolated terpolymer and the RSV of each terpolymer determined on a 0.1% solution in chloroform at 25° C. The monomers terpolymerized are indicated by the abbreviations defined in Examples 5–10.

The terpolymers produced in these examples were largely amorphous as shown by X-ray.

*Table V*

| Example No | 17 | | | 18 | | |
|---|---|---|---|---|---|---|
| Monomer | EO | PO | ECH | EO | PO | ECH |
| Parts of Monomer, Wt. Percent | 64 | 16 | 20 | 24 | 25 | 51 |
| Reaction Time, Hrs | | 2 | | | 6 | |
| Isolated Terpolymer: | | | | | | |
| Percent Conversion | | 10 | | | 8 | |
| RSV | | 19.8 | | | 17.7 | |
| Monomer Composition, Wt. Percent | 80 | 14.5 | 5.5 | | | 18.5 |
| Solubility in Water | Largely soluble | | | Insoluble | | |
| Appearance | Snappy rubber | | | Snappy rubber | | |

As stated before, the epoxide copolymers of this invention are solid high molecular weight amorphous polymers usually with elastomeric properties. Where elastomeric properties are observed, as in particular, with copolymers of alkylene oxides and saturated glycidyl ethers, it has been found that the copolymers have a reduced specific viscosity of at least about 0.5, and preferably about 1.0 as measured on a 0.1% solution of the copolymer in α-chloronaphthalene at 100° C. At an RSV substantially below about 0.5 these copolymers lose their elastomeric properties and are incapable of being handled on conventional rubber equipment, and while they can be cross-linked, i.e. vulcanized, the product is either not a useful rubber or not a rubber at all. In the same way, liquid copolymers are not elastomeric and are not amenable to cross-linking, i.e. vulcanization, by conventional rubber technology. Crystalline copolymers are capable of being cross-linked, but the vulcanizates have no elastomeric properties and so are not useful as rubbers. On the other hand, the solid amorphous copolymers of this invention having an RSV of at least about 0.5 can be cross-linked to produce useful rubbers. For optimum physical properties, ease of handling on commercial rubber equipment and ease of fabrication, the copolymers of this invention will have an RSV of at least about 1.0.

It can be seen from the examples that often a small amount of crystalline copolymer is formed along with amorphous copolymer. Where it is desirable to have solely amorphous copolymer, a separation can be carried out. The various separations that can be employed will be obvious to those skilled in the art. For example, the mixed copolymer can be extracted with an inert solvent, such as acetone, in which the amorphous copolymer is soluble and the crystalline copolymer is insoluble. Another method is to dissolve the mixture in an inert liquid which at elevated temperatures is a solvent for both amorphous and crystalline copolymer and from which the crystalline copolymer will crystallize at low temperatures.

Solid elastomeric copolymers which are essentially wholly amorphous are desirable for use in applications where the best elastomeric properties, i.e., highest elongation with the most rapid recovery, are desired. However, for some applications where less elasticity is desired, an amorphous copolymer can be used in a mixture with a crystalline copolymer. To retain the elastomeric characteristic, such a mixture should be predominantly amorphous and will contain less than about 30 percent more preferably less than about 20 percent, of the crystalline copolymer. It should be noted that the amorphous copolymers of this invention are also useful to modify the properties of the crystalline copolymers which are stiff plastics. Thus, mixtures or blends of amorphous and crystalline copolymers, wherein the crystalline copolymer predominates, are more flexible than the crystalline copolymer and have properties intermediate those of a rubber and those of a plastic.

The amorphous elastomeric copolymers of this invention can be cross-linked to produce new and useful rubbers. Those which are high in the halogen-containing epoxide have excellent swelling resistance to solvents such as the hydrocarbons and chlorinated hydrocarbons. These rubbers usually have excellent building tack and give low heat build-up on flexing. They are outstanding in aging resistance. This includes ordinary outdoor exposure, ozone exposure and heat aging in air up to temperatures of 125° C. Another property of these rubbers is their low flex cut growth. In particular, those copolymers high in halogen-containing epoxide, especially with alkylene oxides and saturated glycidyl ethers, have much better low temperature properties than their halogen-containing epoxide homopolymer counterparts. Copolymers containing smaller amounts of halogen-containing epoxides, especially with alkylene oxides, have superior hysteresis and low temperature properties and offer improved general purpose elastomers for use in tires. In those cases where ethylene oxide is one of the monomers, unique water-soluble elastomers which can readily be vulcanized to useful compositions are formed. These water-soluble elastomers can be quaternized by reaction with amines to give useful cationic polymers. Those amorphous copolymers containing a large amount (over about 50%) of cyclic epoxide monomer, such as styrene oxide, cyclohexene oxide, etc., are not elastomeric, but rather hard, somewhat rigid compositions, which are advantageous because of their very high molecular weight and thus greatly improved physical properties. They are advantageous over their cyclic epoxide homopolymers since they can be readily cross-linked in the same manner as the elastomers to give harder, more rigid compositions having better high temperature properties and solvent resistance. Such hard, rigid compositions are useful as molded objects, protective coatings, etc. Thus, it can be seen that the amorphous copolymers of this invention are a broad and versatile group of compositions possessing utility in various fields. They can, for example, be used in gaskets, hose, belting, mechanical goods, tires, adhesives, polymeric plasticizers, etc.

Cross-linking can readily be carried out by means of a polyamine. Any amine containing two or more amino groups can be used as, for example, ethylenediamine, tetramethylenediamine, hexamethylenediamine, piperazine, etc. Particularly useful are the salts of these amines such as hexamethylenediamine carbamate. The amine can be simply blended with the copolymer and the mixture then cured at elevated temperature as, for example, at a temperature of from about 120° C. to about 175° C. for about 20 to 40 minutes. Another method of cross-linking these copolymers is to heat a mixture of the copolymer, an amine and a sulfur compound, such as sulfur, a dithiocarbamate, a dialkyl thiuram disulfide, a tetraalkyl thiuram mono- or disulfide or a thiazole. Again, the cross-linking agents can be simply blended with the copolymer and the curing effected by heating to a temperature of from about 120° C. to about 175° C. for about 20 to 40 minutes. In addition to the cross-linking agents, other ingredients can be incorporated as, for example, extenders, fillers (carbon black, silica, etc.), pigments, plasticizers and other additives commonly used in rubber vulcanization.

The copolymers of this invention, by virtue of their halogen groups, can be employed in reactions which yield new and useful derived polymers. For example, they can be reacted with a tertiary amine to produce quaternized derivatives that are soluble in water and exhibit cationic properties or they can be reacted with thiourea to give thiouronium salts which can be decomposed to mercaptan derivatives.

This application is a continuation-in-part of my application U.S. Serial No. 738,626, filed May 29, 1958, now abandoned, and of my application U.S. Serial No. 812,079, now Patent No. 3,135,705, filed May 11, 1959, which is in turn a continuation-in-part of my application U.S. Serial No. 738,626 and now abandoned.

What I claim and desire to protect by Letters Patent is:

1. A solid, rubbery, essentially wholly amorphous copolymer of an epoxide containing at least one aliphatic halogen group and at least one other epoxide having the formula

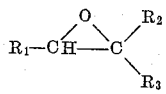

where $R_1$, $R_2$ and $R_3$ are radicals selected from the group consisting of hydrogen, alkyl, and alkoxyalkyl, but at least one of said R radicals being hydrogen, said copolymer having a reduced specific viscosity of at least about 0.5 as measured on a 0.1% solution of the copolymer in α-chloronaphthalene at 100° C.

2. The composition of claim 1 wherein the epoxide containing at least one aliphatic halogen group is epichlorohydrin and the other epoxide is an alkylene oxide.

3. The composition of claim 2 wherein the alkylene oxide is propylene oxide.

4. The composition of claim 2 wherein the alkylene oxide is ethylene oxide.

5. The composition of claim 1 wherein the epoxide containing at least one aliphatic halogen group is 2-chloroethyl glycidyl ether and the other epoxide is an alkylene oxide.

6. The composition of claim 5 wherein the alkylene oxide is ethylene oxide.

7. The composition of claim 5 wherein the alkylene oxide is propylene oxide.

8. A solid, rubbery, essentially wholly amorphous copolymer of epichlorohydrin, ethylene oxide and propylene oxide.

References Cited in the file of this patent

UNITED STATES PATENTS

| 2,706,181 | Pruitt et al. | Apr. 12, 1955 |
| 2,870,101 | Stewart et al. | Jan. 20, 1959 |
| 2,871,219 | Baggett et al. | Jan. 27, 1959 |

FOREIGN PATENTS

| 793,065 | Great Britain | Apr. 9, 1958 |

OTHER REFERENCES

Webster's New International Dictionary, 2nd ed., published by G. and C. Merriam Co., 1953 (pp. 88 and 2120 relied on).

Bennet: "Concise Chemical and Technical Dictionary"; published by Chemical Publishing Co., 1947 (page 797 relied on).

Mark and Tobolsky: "Physical Chemistry of High Polymeric Systems," published by Interscience Publishers (New York), 1950 (pp. 357, 358, and 359 relied on).